Sept. 10, 1940.  R. D. PIKE  2,214,345
METHOD OF BURNING PORTLAND CEMENT CLINKERS
Filed Jan. 9, 1939
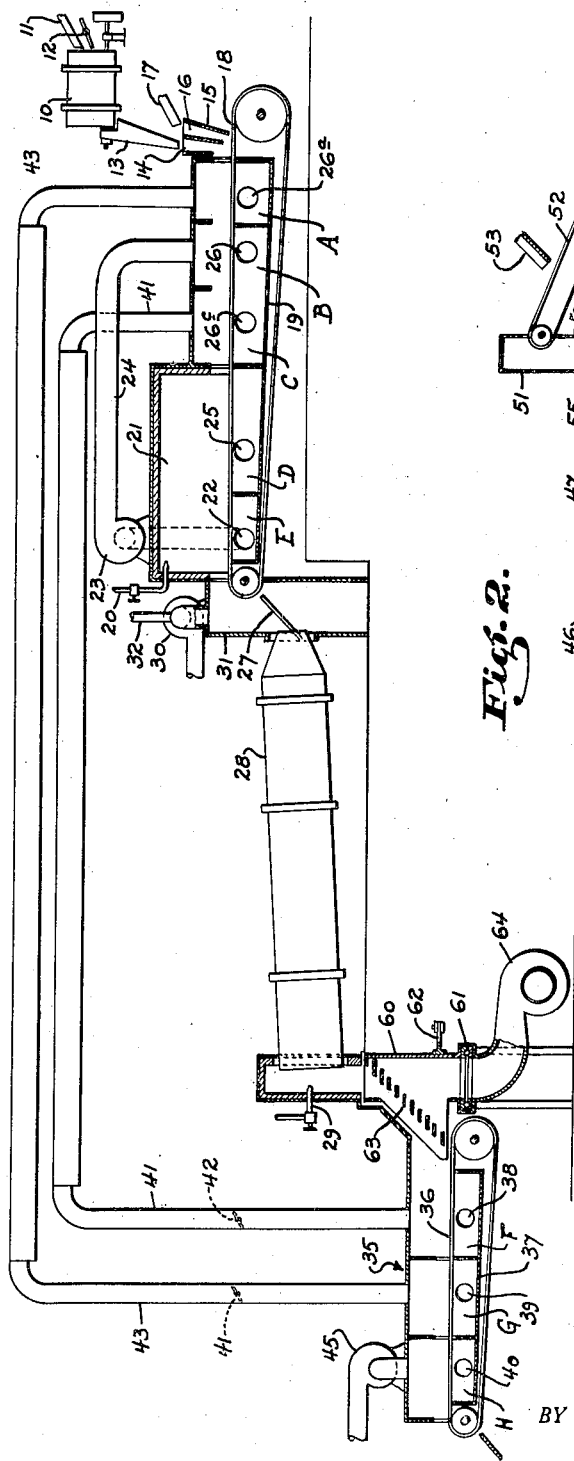
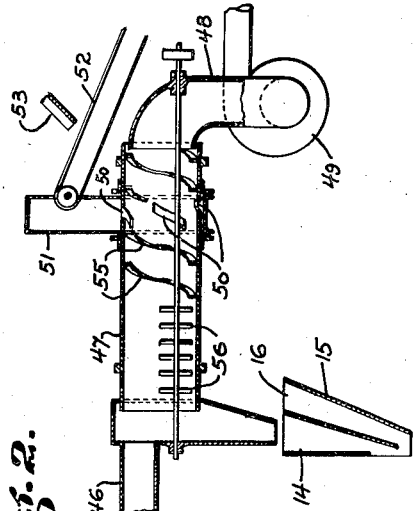
INVENTOR.
Robert D. Pike.
BY
Chas. E. Townsend.
ATTORNEY.

Patented Sept. 10, 1940

2,214,345

UNITED STATES PATENT OFFICE 2,214,345

METHOD OF BURNING PORTLAND CEMENT CLINKERS

Robert D. Pike, Piedmont, Calif.

Application January 9, 1939, Serial No. 249,947

5 Claims. (Cl. 263—53)

The present invention relates to a method and apparatus for burning Portland cement clinker and particularly to a method and apparatus in which the raw cement mix is formed into nodules or pellets with a small amount of water before it is subjected to thermal treatment for converting it into clinker.

The invention is applicable by slight modification in its form to either dry or wet process Portland cement plants. In dry plants it is the practice to nodulize the cement mix by adding a suitable quantity of water, say 15 to 17 per cent, thereto, while in wet plants the wet mix or slurry is generally dewatered by suction filters to produce a filter cake of about 18 to 30 per cent water, which is further dried by the addition of dried or partially burned material and in some cases by the addition of dust from various stages of the clinkering process to obtain the correct consistency for nodulizing.

It is the object of the present invention to provide a method and apparatus for burning clinker with economy of fuel and space, to burn large quantities of clinker uniformly and continuously, with many factors readily controllable by an operator without interruption of the process, to burn clinker in a manner that will minimize the destructive effect of the operation on the apparatus employed, to burn clinker with a minimum production of dust, and to produce a thoroughly and uniformly burned clinker in which the content of alkali, sulphate, and free lime may be controlled and maintained within required limits.

Further objects and advantages of the invention are made apparent in the following detailed description, in which reference is made to the accompanying drawing, illustrating one form of the invention.

In the drawing:

Fig. 1 is a diagrammatical view in side elevation with parts shown in section of an apparatus for burning clinker in a dry process plant in accordance with the present invention, and Fig. 2 is a longitudinal vertical section of one form of nodulizing apparatus which may be employed in burning clinker according to the present invention in a wet process plant.

Referring first to Fig. 1 of the drawing, a nodulizer is indicated at 10. This nodulizer may be of any conventional type employed for converting dry raw mix into nodules or pellets. The type illustrated and preferred for the process of the present invention is that in which a rotating drum provided with an internal paddle beater operating in opposite direction to the drum is employed to receive the dry mix from a chute as indicated at 11 and a supply of water from a suitable nozzle such as indicated at 12. The water feed is preferably regulated to produce nodules having a water content of about 17 per cent and it is desirable in practicing the present invention to form nodules of a fairly uniformly-graded size of about 3 to 4 mesh screen, though finer or coarser nodules may be used in some cases. A uniform size of nodule is desirable for the purpose of maintaining a substantially uniform flow of gas downwardly through the bed of nodules during the subsequent steps of the process presently to be described.

The nodulizer 10 delivers these uniformly-sized nodules through a chute 13 to the forward compartment 14 of a feed box 15, the rear compartment 16 of which receives burned clinker from a chute indicated at 17. The feed box 15 is arranged to deliver the nodules and burned clinker to the moving grate 18 of a sintering machine, arranged for the purpose of drying and calcining the nodules.

The sintering machine here illustrated is of the type known as a "Dwight & Lloyd Down-Draft Sintering Machine" and is described in detail in the United States patent to R. W. Hyde, No. 1,810,313, issued June 16, 1931. This general type of machine is preferred for the practice of the present invention, and I find that in employing a sintering machine 7 feet wide by 100 feet long the practice of the present invention will result in the production of from 4,000 to 5,000 barrels of 365 pounds each daily, which is an output hitherto unobtained by any single unit for burning clinker.

The clinker which is delivered to the rear compartment 16 of the feed box 15 is preferably obtained by screening the burned clinker resulting from the process and returning to the feed box a selected size, say somewhat less than ¼ to ½ inch mesh. This returned clinker, which corresponds to approximately 20 to 25 per cent of the net output of the apparatus, is deposited by well-known means in a layer about one inch thick on the top and sides of the moving grate 18 of the sintering machine, thus forming a protective layer between the metal of the grate and the sides thereof, and the bed of nodules deposited thereon through the compartment 14 of the feed box. The bed of nodules which overlies the protective layer of burned clinker on the grate is preferably from 10 to 12 inches thick. The relatively thin layer or so-called dressing of sized clinker on the grate serves to protect the metal of the grate from becoming overheated, and also prevents dust and small fragments of the pellets from falling through the grate and being carried away with exhaust gases. The burned clinker also serves in the rotary kiln stage of the process presently to be described to assist thorough burning of the clinker and to effect a reduction of free lime as well as alkali and sulphate resulting from the process.

Directly underlying the grate of the sintering machine is a windbox 19 which is divided into zones which for convenience in reference are designated as zones A, B, C, D, and E. The grate 18 of the sintering machine, laden with the dressing of clinker and layer of nodules in the manner described, moves through these zones to subject its burden of nodules to a succession of thermal treatments, the ultimate result of which is to remove by calcination at least 90 per cent of the carbon dioxide associated with the calcium and magnesium carbonate of the raw mix. The grate moves at a regulatable but usually constant speed of about 4 to 6 feet per minute. The calcination of the nodules is effected primarily by injected fuel fired through a burner 20 into a furnace 21 which is arranged over one end of the grate 18. The flame from the burner 20 is preferably injected into the furnace longitudinally thereof and counter-current to the movement of the grate, but may be introduced in any suitable manner. The heat and products of combustion from this flame pass downwardly through the material on the grate, principally over the zones E and D, and the hotter gases are drawn off through a flue 22 and by a fan 23 which effects delivery of the hot exhaust gases through pipe 24 to that section of the grate overlying zone B for preheating the nodules on the grate. The remaining products of combustion from the flame 20 are drawn from zone D through a flue 25 by a fan, not shown, and delivered thereby to an exhaust stack.

I prefer to use cold atmospheric air for secondary air of combustion at the burner 20 rather than to utilize hot air derived from the clinker cooling process as described in Letters Patent 1,468,168 and 1,605,279, issued to me. As in the present invention, the hot air from the cooling process is preferably utilized, as will presently appear, for the step of drying nodules on the grate 18. In this way the heat of this air is more efficiently utilized and the further advantage is obtained of reducing the intensity of combustion in the furnace 21 and of subjecting the wet nodules to a moderate temperature during the first or drying step, which minimizes the danger of shattering them.

The amount of fuel delivered to the burner 20 for effecting 90 per cent calcination of the raw mix differs in the case where hot exit gas from the rotary kiln is utilized in the furnace, and in the case where this gas is discarded. In the former case, about 585,000 B. t. u. per barrel of clinker delivered to the grinding plant is required, while in the latter case this is reduced to about 440,000 B. t. u.

About 38 per cent of the gases resulting from the burner 20 in the furnace 21 are withdrawn through zone E, which zone in a sintering machine of the dimensions set forth above will be about 15 feet long, and the withdrawal of these gases is so regulated that their average temperature will be from 900° to 1000° F. Under this temperature the grate does not become overheated but the nodules thereon are calcined 90 per cent or more and these gases, when delivered by fan 23 and pipe 24 to zone B, which is approximately 10 feet long, are sufficiently hot to effect drying of the nodules as they pass through this zone. After serving this purpose, the gases are withdrawn from zone B through a flue 26 by a fan, not shown, and delivered thereby to the stack at a temperature of about 160°. The balance of the gases from the furnace 21, or about 62 per cent, which pass through the flue 25, leave the windbox at a temperature of about 350° to 400° F. The length of the zone D will be somewhat greater than that of zone E, and in the present instance, would be about 31.5 feet.

The raw mix, calcined 90 per cent or more in passing through the sintering machine, falls in a continuous stream from the end of the grate 18 onto a chute such as indicated at 27, which effects its delivery into the upper end of an inclined rotary kiln, indicated at 28. The kiln 28 is fired through the medium of a burner 29 in a conventional manner to produce a uniform, well-burned clinker for the production of 4,000 to 5,000 barrels daily net clinker delivered to the grinder. The rotary kiln 28 will be approximately 100 feet long and about 13 feet, 6 inches, inside diameter of its steel shell, which is lined with refractory material of about nine inches thick, as is conventional practice.

This extraordinarily large output of a rotary kiln of this relatively small size results from the fact that the rotary kiln receives hot feed at least 90 per cent calcined, so that virtually the entire length of the rotary kiln serves as a clinkering zone. This method insures the production of a high grade clinker with a relatively small amount of fuel injected through the burner 29 and consequently the life of the refractory lining of the kiln is prolonged and upkeep costs are maintained low. I find that it is sufficient to fire about 260,000 B. t. u. per barrel of net clinker through the burner 29. This is but a small fraction of the fuel ordinarily fired through a rotary kiln for burning clinker and results not only in a saving of the refractories in the kiln but has the further advantage of promoting visibility in the kiln, which aids the operator in controlling the clinkering process.

There are further advantages of the present process which may be appropriately noted at this point. A very small quantity of dust arises in the rotary kiln when the calcines drop into the upper end. This is due to the fact that the nodules are relatively small and also that they are well calcined and highly heated, making them hard and not easily broken up into dust. Furthermore, the relatively low velocity of gas in the rotary kiln lessens the tendency of dust to be picked up. The gas leaving the upper end of the rotary kiln is at a temperature of about 2,500° F. and being relatively free of dust may be used to advantage in the calcining furnace 21 without depositing enough dust on the bed of nodules therein to impair the passage of gas through the bed. This gas from the rotary kiln will, however, contain all of the fumes of alkali and sulphate volatilized from the clinker in the rotary kiln, and if these fumes are permitted to pass downwardly through the bed of nodules in the furnace 21, there will be an absorption by the nodules which will result in the building up of a circulating load of alkali and sulphate with a tendency to increase these constituents of the clinker to undesired limits. Consequently, when the alkali and sulphate content of the raw mix is high, or when rigid specifications place a low limit on these constituents, a fan 30 arranged to withdraw gases from a housing 31 adjacent the upper end of the rotary kiln, may be employed and the speed of this fan may be regulated to withdraw and discard any desired proportion of these gases. A cold air inlet 32 may be provided for admitting and mixing cold air with the hot gases so that they may more readily be handled through the fan 30. Rather than admitting cold air and wasting these gases, however, their heat may be utilized by passing them through a waste heat boiler, as is conventional practice, or their potash content may be recovered as proposed in my United States Patent No. 1,596,509. A further advantage of this process results from the fact that the nodules are calcined at least 90 per cent on the grate of the sintering machine so that a relatively small amount of fuel is burned in the rotary kiln and the alkali may be discarded from the system with a relatively low heat loss, which is about 150,000 B. t. u. per barrel, and most of which may be preserved if a waste heat boiler is available.

The fan 30 will also serve as a means for regulating the draft in the rotary kiln in the event of a slight non-uniformity in draft through the bed of pellets on the calcining grate. Similar regulation may also be obtained through the medium of the fan 23 and that fan, not shown, withdraws the gases from zone D through flue 25. The fan 30 may also be employed to advantage to effect an auxiliary draft through the rotary kiln in starting up.

It is necessary that the hot clinker falling from the discharge end of the rotary kiln 28 be cooled. For this purpose I prefer to use a clinker cooler of the type indicated at 35, employing a "Dwight & Lloyd Sintering Machine" and having a slowly advancing cooling grate 36 similar in construction and operation to the grate 18 of the sintering machine used for calcining. A windbox 37 underlying the grate 36 is divided into zones which will be referred to as zones F, G, and H, and cooling of the clinker deposited upon the grate 36 from the rotary kiln is preferably effected by air blown upwardly through the grate from these zones. The cooling air is delivered to the zones F, G and H by suitable fans, not shown, through flues which enter these zones at 38, 39, and 40, respectively. The air entering through the first zone F emerges from the top of the hot clinker on the grate 36 at a temperature of about 1400° F. A portion of this air may be permitted to pass directly into the rotary kiln where it serves to support combustion of the fuel therein, and the balance passes through a flue 41, which may be controlled by a damper 42, to the drying zone C of the sintering machine.

The cooling air entering through zone G emerges from the top of the clinker at a lower temperature, or approximately 600° F., and passes through a flue 43 with a controlling damper 44 to the first or drying zone A of the sintering machine.

As previously set forth, the fan 23 is delivering hot gas at 900° to 1,000° F. to zone B for drying purposes. All of the hot air and gas entering the sintering machine over zones A, B, and C is drawn downwardly through the bed of nodules on the grate over these zones for drying and preheating the nodules and is withdrawn through the flues 26, 26a, and 26c by suitable fans, not shown, for delivery to the stack.

The flues 41 and 43 and the flue 24 may be combined and the separate zones A, B, and C merged into one with substantially the same result, except that by the separation of these zones and gases of different temperatures as described, the efficiency of drying is greater due to the exposure of the nodules to zones of successively higher temperatures.

The final step in the cooling process takes place over zone H, into which zone a large volume of cold air is introduced through the flue 40. A fan 45 is positioned above the zone H and receives the air from this stage of the cooling process at a temperature of about 200° to 250° F. This air will contain a considerable quantity of dust, which is preferably salvaged by passing the air through a conventional cyclone collector, and in dry process plants the residual heat is wasted. In wet process plants, however, this warm air, with its dust, may be utilized to advantage in nodulizing the filter cake. An apparatus in which this air may be so utilized is illustrated in Fig. 2 of the drawing, in which a flue 46 is shown to receive the air from the fan 45 and to effect its introduction into a rotary nodulizing drum 47. At the opposite end of the drum 47 a flue 48 and a fan 49 serve for removing the spent moist air from the system. The filter cake is introduced to the drum 47 through slots 50 therein which communicate with the interior of a feed box 51 to which the cake is delivered by any suitable means, such for example as a conveyor belt 52. A spout 53 feeds onto this belt all dust collected from the system, as, for example, from the discharge of fans 30, 45, and 49, together with all or part of any material which drops through the grates of the sintering machine or cooler and which material may be collected by any suitable means not shown. A small percentage of calcined nodules may if desired be removed from the system just before they enter the rotary kiln and also deposited on the filter cake before it enters the nodulizer 47 if desired. As the combined filter cake and dried materials fall into the drum 47 of the nodulizer through the slots 50 thereof, they are fed forwardly by helical flanges 55 secured to the inner wall of the drum until they come into contact with a rotary beater 56 which, in accordance with conventional practice, is turned in a direction opposite to the drum and at a greater speed and which, together with the drying action of the warm air introduced through flue 46, effects nodulizing of the material, the nodules falling from the discharge end of the drum 47 into the compartment 14 of the feed box 15 as heretofore described. Auxiliary fuel may be used for driving if desired.

Referring again to the apparatus disclosed in Fig. 1 and particularly to the discharge end of the rotary kiln 28, as very large amounts of clinker are passing through the apparatus and as the clinker falling from the discharge end of the rotary kiln has a temperature exceeding 2,500° F., it has a tendency to form into pasty masses unless subjected to immediate drastic cooling. In order to effect such cooling, and also to effect uniform feeding of the clinker onto the grate 36 of the cooling apparatus, I have provided the apparatus disclosed, which comprises a vertically-disposed tubular member 60 supported at its lower end on a bearing 61 so that it may be oscillated by a suitable mechanism, not shown, through the means of a rearwardly projecting crank arm 62. The member 60 is supported in a position to receive the very hot clinker falling from the end of the rotary kiln and is provided with an inclined chute 63 of spaced, superposed bars. The chute 63 slopes outwardly from the cylinder-like member 60 to a point where its lower end overlies the receiving end of the grate 36 of the cooler and the oscillatory movement of the member 60 is such that it will effect even distribution or spreading of the material falling down the chute 63 over the entire center of the grate 36. A fan 64 is arranged to deliver cold air upwardly into the cylinder 60, which cold air will escape through the spaces between the bars of the chute 63. This air passing between the bars at great velocity has a desirable initial cooling effect on the very hot clinker from the rotary kiln and prevents its sticking together in lumps or masses as it tumbles down the chute 63. This makes possible the delivery of large quantities of extremely hot clinker to the cooling apparatus.

What I claim and desire to secure by Letters Patent is:

1. The method of burning Portland cement clinker, which comprises forming raw mix into nodules, placing said nodules in a bed on a moving grate, calcining said nodules by supplying an independent source of gaseous products of combustion, and drawing said products downwardly through the bed, burning the calcines into clinker in a rotary kiln, cooling said clinker with air and drying the nodules before calcining with the heated air derived from cooling.

2. A process for burning Portland cement clinker which consists in forming the raw mix into nodules, placing them in a bed on a moving down-draft grate, drying with a separate source of low temperature heat, calcining with externally applied gases of combustion to drive off more than 80 per cent of the $CO_2$ associated with the raw mix, burning the calcines into clinker in an independently fired rotary kiln, cooling the clinker and returning a portion of it as a dressing for the grate beneath the nodules.

3. A process for burning Portland cement clinker which comprises forming the raw mix into nodules, placing these in a bed on a moving down-draft grate, calcining with externally applied gases of combustion to drive off more than 80 per cent of the $CO_2$ associated with the raw mix, burning the calcines into clinker in an independently fired rotary kiln, cooling the clinker with air, and drying the nodules with the warm air thus derived.

4. A process for burning Portland cement clinker which comprises forming the raw mix into nodules, placing these in a bed on a moving down-draft grate, calcining with externally applied gases of combustion to drive off more than 80 per cent of the $CO_2$ associated with the raw mix, burning the calcines into clinker in an independently fired rotary kiln, cooling the clinker with air, drying the nodules with the warm air thus derived, and returning a portion of the clinker as a dressing for the calcining grate.

5. A process for burning Portland cement clinker which comprises forming the raw mix into nodules, placing these in a bed on a moving down-draft grate, calcining with externally applied gases of combustion to drive off more than 80 per cent of the $CO_2$ associated with the raw mix, burning the calcines into clinker in an independently fired rotary kiln discarding exit gas from the rotary kiln, cooling the clinker with air and drying the nodules with warm air derived from the cooling step.

ROBERT D. PIKE.